(12) United States Patent  
Gentry et al.

(10) Patent No.: US 10,746,897 B1
(45) Date of Patent: Aug. 18, 2020

(54) OCCUPANCY SENSING SYSTEMS AND METHODS

(71) Applicant: Steelcase Inc., Grand Rapids, MI (US)

(72) Inventors: Landon Gentry, Lake Oswego, OR (US); Scott E. Wilson, Las Cruces, NM (US); Richard Thomas Raeke, Portland, OR (US)

(73) Assignee: STEELCASE INC., Grand Rapids, MI (US)

( * ) Notice: Subject to any disclaimer, the term of this patent is extended or adjusted under 35 U.S.C. 154(b) by 161 days.

(21) Appl. No.: 15/884,095

(22) Filed: Jan. 30, 2018

Related U.S. Application Data

(60) Provisional application No. 62/456,967, filed on Feb. 9, 2017.

(51) Int. Cl.

| | |
|---|---|
| *F24F 11/46* | (2018.01) |
| *G01V 8/20* | (2006.01) |
| *G01V 11/00* | (2006.01) |
| *G01P 13/00* | (2006.01) |
| *F24F 11/56* | (2018.01) |
| *H05B 47/105* | (2020.01) |
| *F24F 130/30* | (2018.01) |
| *F24F 120/12* | (2018.01) |

(52) U.S. Cl.
CPC ............... *G01V 8/20* (2013.01); *F24F 11/46* (2018.01); *F24F 11/56* (2018.01); *G01P 13/00* (2013.01); *G01V 11/002* (2013.01); *H05B 47/105* (2020.01); *F24F 2120/12* (2018.01); *F24F 2130/30* (2018.01)

(58) Field of Classification Search
CPC ............... F24F 2120/00; F24F 2120/10; F24F 2120/12; F24F 2120/14; F24F 11/30
See application file for complete search history.

(56) References Cited

U.S. PATENT DOCUMENTS

| | | |
|---|---|---|
| 4,882,567 A | 11/1989 | Johnson |
| 5,581,236 A | 12/1996 | Hoseit et al. |
| 5,640,143 A | 6/1997 | Myron et al. |
| 5,656,995 A | 8/1997 | Peters |
| 5,986,357 A | 11/1999 | Myron et al. |
| 6,078,253 A | 6/2000 | Fowler |
| 6,791,458 B2 | 9/2004 | Baldwin |

(Continued)

FOREIGN PATENT DOCUMENTS

| | | |
|---|---|---|
| WO | 2005106820 A1 | 11/2005 |
| WO | 2017076433 A1 | 5/2017 |

*Primary Examiner* — Len Tran
*Assistant Examiner* — Daniel C Comings
(74) *Attorney, Agent, or Firm* — Quarles & Brady LLP

(57) ABSTRACT

The present disclosure provides systems and methods for determining occupancy status of a space. The systems and methods can utilize one or more space sensors in combination with one or more boundary sensors. The space sensors can transmit passive signals corresponding to presence of movement in the space. The boundary sensors can transmit boundary signals corresponding to movement into or out of the space. In response to falling edges of a passive signal and a boundary signal occurring within a predetermined time period of one another, an indication that the space is not occupied can be provided. In some cases, the passive signals and the boundary signals can be communicated via a gateway utilizing a signal communication protocol.

44 Claims, 13 Drawing Sheets

(56) References Cited

U.S. PATENT DOCUMENTS

| | | |
|---|---|---|
| 6,909,921 B1 * | 6/2005 | Bilger .................... G05B 15/02 700/14 |
| 6,992,577 B2 | 1/2006 | Tsuji et al. |
| 7,034,675 B2 | 4/2006 | DiPoala et al. |
| 7,123,139 B2 | 10/2006 | Sweeney |
| 7,298,253 B2 | 11/2007 | Petricoin et al. |
| 7,375,630 B2 | 5/2008 | Babich et al. |
| 7,411,489 B1 | 8/2008 | Elwell et al. |
| 7,482,918 B2 | 1/2009 | Allen |
| 7,623,676 B2 | 11/2009 | Zhao et al. |
| 7,735,918 B2 | 6/2010 | Beck |
| RE41,674 E | 9/2010 | Sasaki et al. |
| 7,896,436 B2 | 3/2011 | Kurrasch et al. |
| 8,009,042 B2 | 8/2011 | Steiner et al. |
| 8,310,365 B2 | 11/2012 | Siegler, II et al. |
| 8,410,445 B2 | 4/2013 | Kim et al. |
| 8,558,179 B2 | 10/2013 | Filson et al. |
| 8,577,711 B2 | 11/2013 | Korecki et al. |
| 8,630,741 B1 | 1/2014 | Matsuoka et al. |
| 8,654,197 B2 | 2/2014 | Nizko et al. |
| 8,743,198 B2 | 6/2014 | Padmanabh et al. |
| 8,797,159 B2 | 8/2014 | Kirkpatrick et al. |
| 9,035,769 B2 | 5/2015 | Steiner et al. |
| 9,148,937 B2 | 9/2015 | Steiner et al. |
| 9,177,195 B2 | 11/2015 | Marcheselli et al. |
| 9,189,751 B2 | 11/2015 | Matsuoka et al. |
| 9,265,128 B2 | 2/2016 | Steiner et al. |
| 9,277,629 B2 | 3/2016 | Steiner et al. |
| 9,288,619 B2 | 3/2016 | Arteaga et al. |
| 9,310,253 B2 | 4/2016 | Katz |
| 9,332,617 B2 | 5/2016 | Mans et al. |
| 9,377,209 B2 | 6/2016 | Kopp |
| 9,459,601 B2 | 10/2016 | Morrow |
| 9,514,636 B2 | 12/2016 | Modi et al. |
| 9,601,001 B2 | 3/2017 | Matsuoka et al. |
| 9,671,526 B2 | 6/2017 | Kumar |
| 2005/0001154 A1 | 1/2005 | Sumitomo et al. |
| 2007/0161270 A1 | 7/2007 | Insalaco et al. |
| 2008/0211668 A1 | 9/2008 | Dixon et al. |
| 2010/0097226 A1 | 4/2010 | Parsons |
| 2010/0299116 A1 | 11/2010 | Tomastik et al. |
| 2011/0169637 A1 | 7/2011 | Siegler, II et al. |
| 2012/0078676 A1 | 3/2012 | Adams et al. |
| 2013/0099124 A1 | 4/2013 | Filson et al. |
| 2013/0173062 A1 | 7/2013 | Koenig-Richardson |
| 2014/0079282 A1 | 3/2014 | Marcheselli et al. |
| 2014/0277757 A1 | 9/2014 | Wang et al. |
| 2015/0022025 A1 * | 1/2015 | Lee .................... H01H 9/54 307/116 |
| 2015/0120360 A1 | 4/2015 | Adriaenssens et al. |
| 2015/0308706 A1 | 10/2015 | Bunker et al. |
| 2015/0334809 A1 | 11/2015 | Mans et al. |
| 2016/0025367 A1 | 1/2016 | Matsuoka et al. |
| 2016/0183687 A1 | 6/2016 | Hoyt et al. |
| 2016/0343243 A1 | 11/2016 | Rabb et al. |
| 2017/0017219 A1 | 1/2017 | Morrow |
| 2017/0105269 A1 | 4/2017 | Balasubramainian et al. |
| 2017/0160428 A1 | 6/2017 | Kumar |

* cited by examiner

OCCUPANCY SENSING SYSTEMS AND METHODS

CROSS-REFERENCE TO RELATED APPLICATIONS

This application is related to, claims priority to, and incorporates herein by reference for all purposes U.S. Provisional Patent Application No. 62/456,967, filed Feb. 9, 2017.

STATEMENT REGARDING FEDERALLY SPONSORED RESEARCH

N/A

BACKGROUND

Occupancy and presence sensing technology is presently deployed in a variety of contexts. Most individuals are familiar with a passive infrared (PIR) sensor that controls room lights. Many of those individuals have experienced the situation where sitting still for too long causes the lights to shut off. The response is for the individual to wave their arms to provide some motion for the PIR sensor to trigger reactivation of the lights. Similarly, many of those individuals have experienced the situation where merely walking past a room is sufficient to trigger a PIR sensor into determining that a space is occupied, thus causing the lights to turn on despite the absence of any individuals within the space. In the context of lighting, this level of occupancy sensing is sufficient, because the cost (brief lack of lighting and having to wave arms or brief presence of lighting where it is not needed) is relatively inconsequential. However, with the advent of more advanced workspaces that include more complex automated processes, such as room reservations that can automatically adjust based on the occupancy status of a given location, activity/productivity tracking/monitoring that can make determinations regarding how people are utilizing various spaces and/or affordances, and other such processes, more accurate occupancy determinations are needed than those provided by traditional occupancy sensing systems.

Accordingly, a need exists for occupancy sensing systems and methods that are robust in terms of their ability to accurately sense occupancy and are also low cost to make and use.

BRIEF SUMMARY

In an aspect, the present disclosure provides a system for detecting occupancy of a space. The system can include a space sensor, a boundary sensor, a processor, and a memory. The space sensor can be aimed toward at least a portion of the space. The space sensor can be configured to sense movement or presence within the at least a portion of the space. The boundary sensor can be positioned to detect movement into and out of the space for at least a portion of a boundary of the space. The processor can be in electronic communication with the space sensor and the boundary sensor. The processor can be configured to send signals to and receive signals from the space sensor and the boundary sensor. The memory can be accessible by the processor and can have stored thereon instructions that, when executed by the processor, cause the processor to perform one or more of the following steps: monitor the received signals; and in response to a first falling edge of a passive signal received from the space sensor and a second falling edge of a boundary signal received from the boundary sensor occurring within a predetermined time of one another, indicate that the space is not occupied.

In another aspect, the present disclosure provides a method of detecting occupancy of a space. The method can include one or more of the following steps: receiving one or more passive signals from one or more space sensors; receiving one or more boundary signals from one or more boundary sensors; and in response to receiving, within a first time period of one another, a first falling edge of a passive signal from the one or more space sensors and a second falling edge of a boundary signal from the one or more boundary sensors, providing an indication that the space is not occupied. The one or more passive signals can correspond to presence or movement in the space. The one or more boundary signals can correspond to movement into or out of the space.

In yet another aspect, the present disclosure provides a method of detecting occupancy of a space. The method can include one or more of the following steps: receiving a passive signal from one or more space sensors; receiving a boundary signal from one or more boundary sensors; and providing an indication that the space is not occupied. The passive signal can correspond to presence or movement in the space. The passive signal can have a first falling edge. The boundary signal can correspond to movement into or out of the space. The boundary signal can have a second falling edge. The first falling edge and the second falling edge can occur within a predetermined time period of one another.

In an additional aspect, the present disclosure provide a method of detecting occupancy of a space. The method can include one or more of the following steps: receiving, at one or more gateways, a passive signal from one or more space sensors; receiving, at the one or more gateways, a boundary signal from one or more boundary sensors; and providing an indication that the space is not occupied. The passive signal can correspond to presence or movement in the space. The passive signal can have a first falling edge. The boundary signal can correspond to movement into or out of the space. The boundary signal can have a second falling edge. The first falling edge and the second falling edge can be within a predetermined time period of one another.

In a further aspect, the present disclosure provide a system for detecting occupancy of a space. The system can include a space sensor, a boundary sensor, a gateway, a processor, and a memory. The space sensor can be aimed toward at least a portion of the space. The space sensor can be configured to sense movement or presence with at least a portion of the space. The boundary sensor can be positioned to detect movement into and out of the space for at least a portion of a boundary of the space. The gateway can be configured to send signals to and receive signals from the space sensor and the boundary sensor. The processor can be electronically coupled to the gateway. The memory can be accessible by the processor and have stored thereon instructions that, when executed by the processor, cause the processor to perform one or more of the following steps: monitor the signals received by the gateway; and in response to a first falling edge of a passive signal received from the space sensor and a second falling edge of a boundary signal received form the boundary sensor occurring with a predetermined time of one another, indicate that the space is not occupied.

In another aspect, the present disclosure provides a signal communication protocol for communicating signals between one or more endpoints and one or more gateways. The protocol can include the following steps: transmitting an event signal from an endpoint in response to a sensed event occurring at an event time; in response to receiving the event signal at a gateway: transmitting an event acknowledgement signal from the gateway; or delaying a predetermined length of time and then transmitting the event acknowledgement signal from the gateway; in response to failing to receive the event acknowledgement signal at the endpoint, periodically transmitting one or more reiterated event signals at predetermined time points following the sensed event, wherein the one or more reiterated event signals each is encoded with an indicator of the timing of the respective reiterated event signal relative to the sensed event; and in response to receiving one of the one or more reiterated event signals at the gateway determining the event time using the indicator of the timing.

In yet another aspect, the present disclosure provides a method of provisioning a system for deployment within a space. The method can include: a) generating a floorplan representing the space; b) generating placement of one or more sensors and one or more gateways within the floorplan; c) delivering the one or more gateways to an information technology installer at the space; d) selecting the number and type of sensors based on the generated placement of step b); e) entering the number and type of sensors into a database; f) packaging the one or more sensors with installation diagrams; g) delivering the packaged one or more sensors to the space; h) mounting the sensors in the space based on the installation diagrams; and i) entering a provisioning mode with the sensors.

DETAILED DESCRIPTION

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

Figure 1:
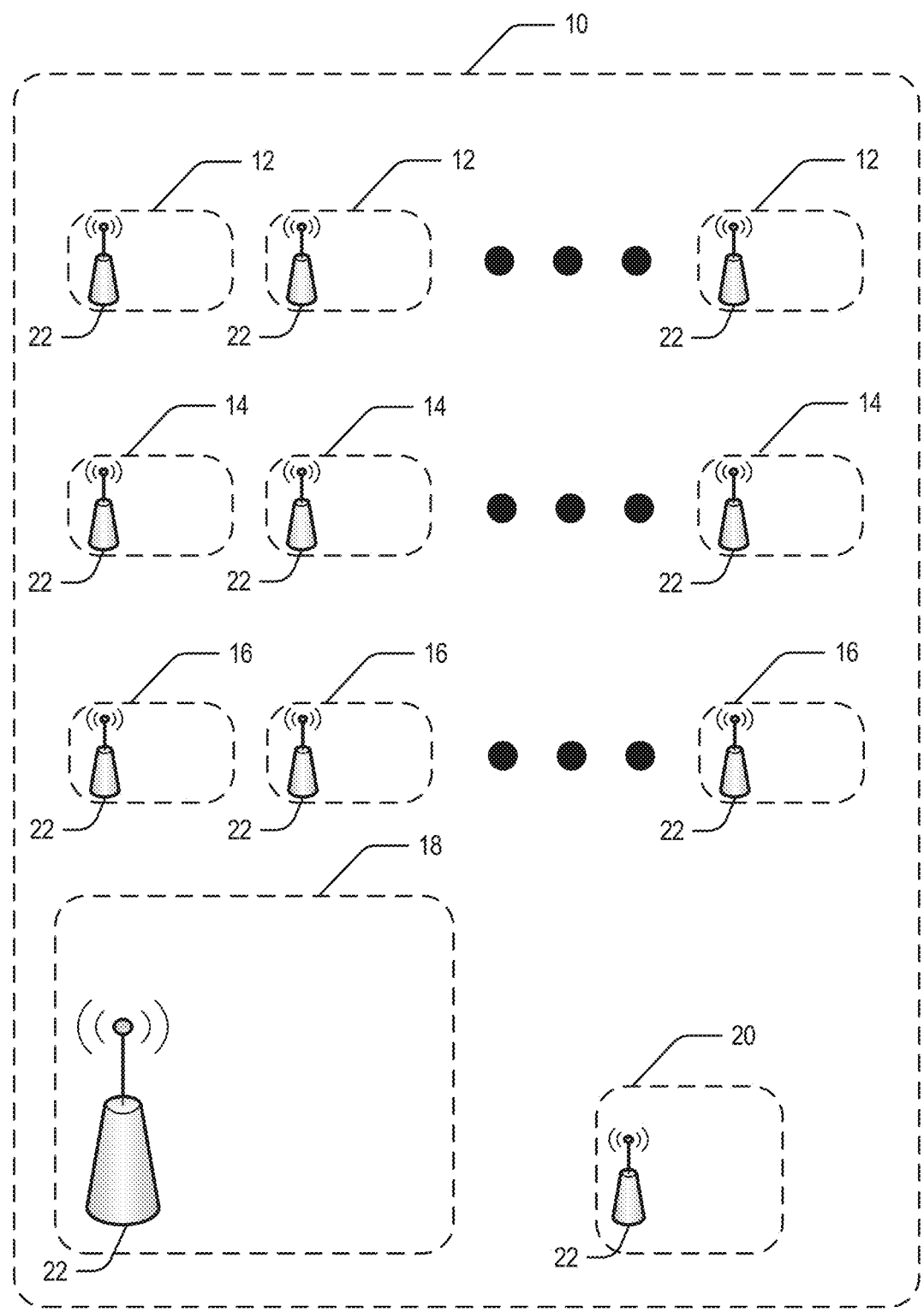
FIG. 1 is a schematic representation of a system in accordance with the present disclosure.

Referring to FIG. 1, this disclosure provides a system 10 for monitoring occupancy of a space. The system can include one or more space sensors 12, one or more boundary sensors 14, and one or more gateways 16. The system 10 can also include a processor 18 and a memory 20. Each of the space sensors 12, boundary sensors 14, gateways 16, processor 18, and memory 20 can include a wireless communication transceiver 22. While a wireless communication embodiment is illustrated, any of the components of system 10 can be hardwired to one another as understood by those having ordinary skill in the art. In some cases, the system 10 can be deployed without the one or more gateways 16. In those cases, the one or more space sensors 12 and the one or more boundary sensors 14 can be configured to communicate directly with the processor 18.

Figure 2:
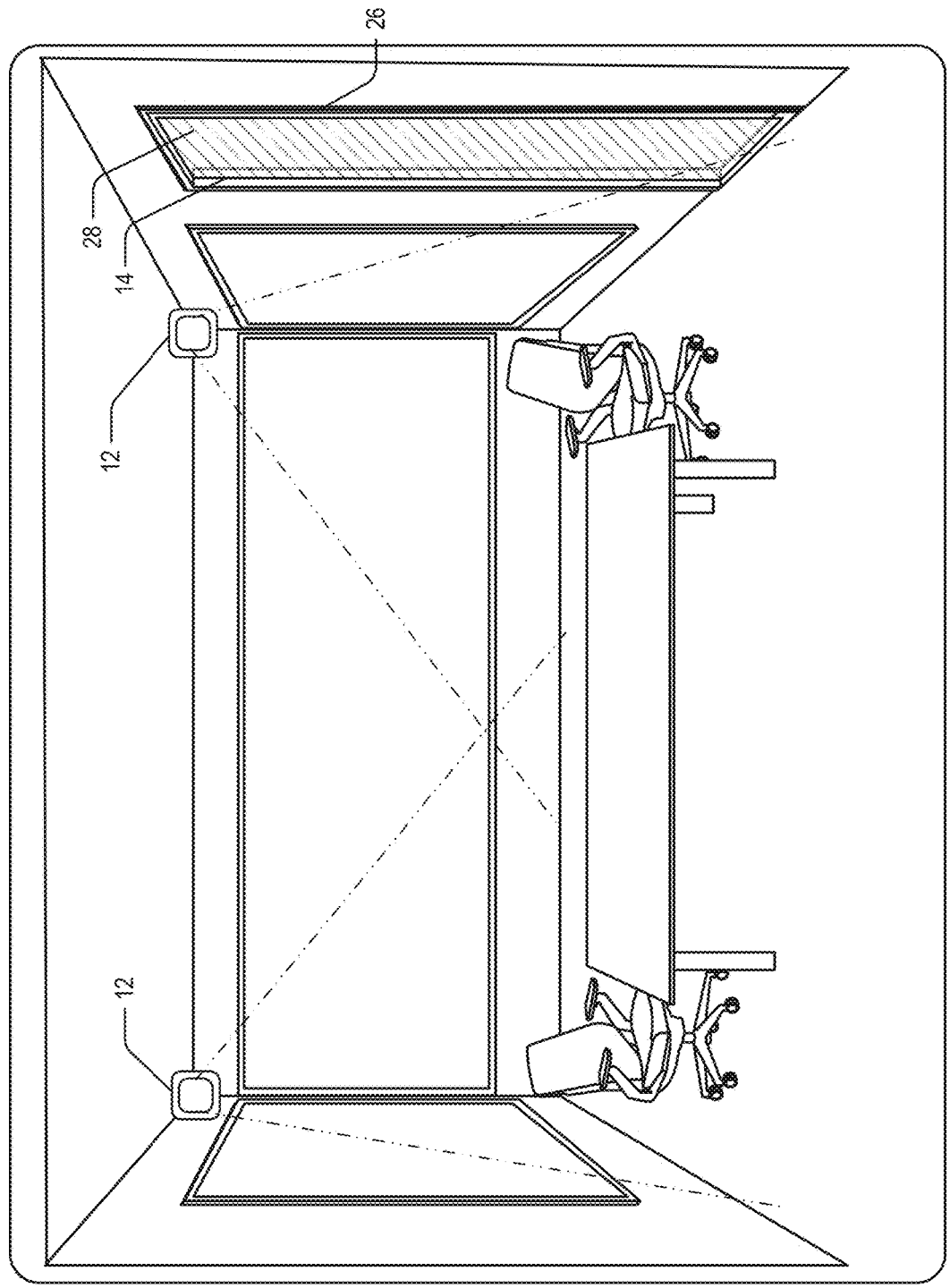
FIG. 2 is a space showing deployment of a system in accordance with the present disclosure.

Referring to FIG. 2, one exemplary aspect of the system 10 is illustrated. In this aspect, the space 24 is the entire area of a room. The system 10 includes two space sensors 12 mounted in corners of the room (note: more or less space sensors 12 can be deployed and they can be placed in different locations, depending on the desired sensing properties). In this illustrated aspect, the only way into our out of the room is via a door 26. A boundary sensor 14 is mounted in the vicinity of the door or within a part of the door, such as the door frame, and is configured to project a boundary field 28 into the doorway. The boundary sensor 14 is configured to sense when the boundary field 28 is penetrated by an object.

Figure 3:
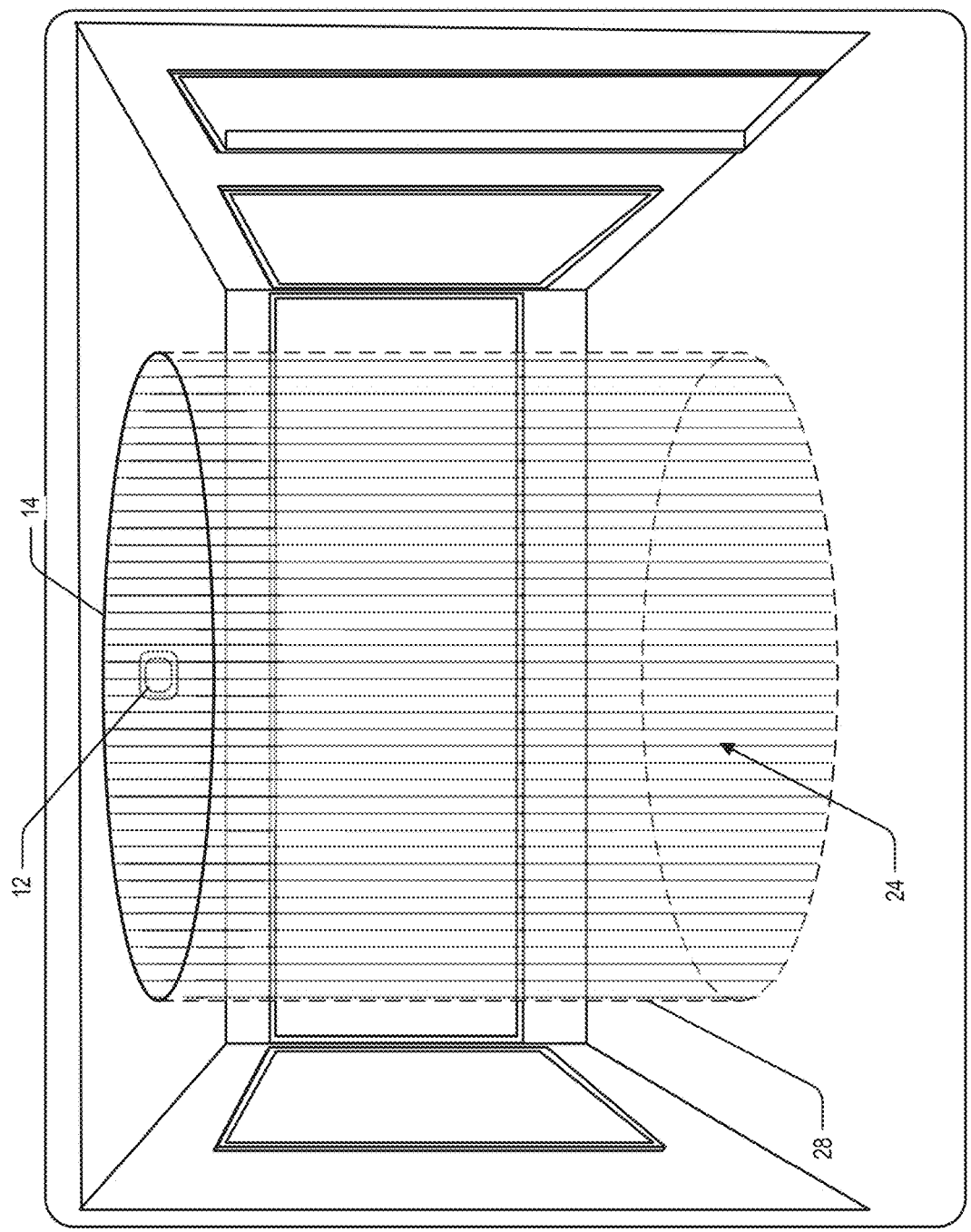
FIG. 3 is a space showing deployment of a system in accordance with the present disclosure.

Referring to FIG. 3, another exemplary aspect of the system 10 is illustrated. In this aspect, the space 24 is a portion of the area of the room. The system 10 includes one space sensor 12 mounted directly above the space 24. In this illustrated aspect, the space 24 can be entered from any horizontal direction (i.e., it cannot be entered from above, due to the ceiling, or below, due to the floor). A boundary sensor 14 is mounted and configured to project a boundary field 28 that covers at least a portion of the boundary of the space 24. In the illustrated aspect, the boundary sensor 14 projects a cylindrical boundary field 28 that covers the entirety of the boundary of the space. In other aspects, the system 10 can include more than one boundary sensor 14 that each projects a boundary field 28 that covers a portion of the boundary of the space, with the total coverage provided by the multiple boundary fields 28 being sufficient to sense penetration of the boundary.

Figure 4:
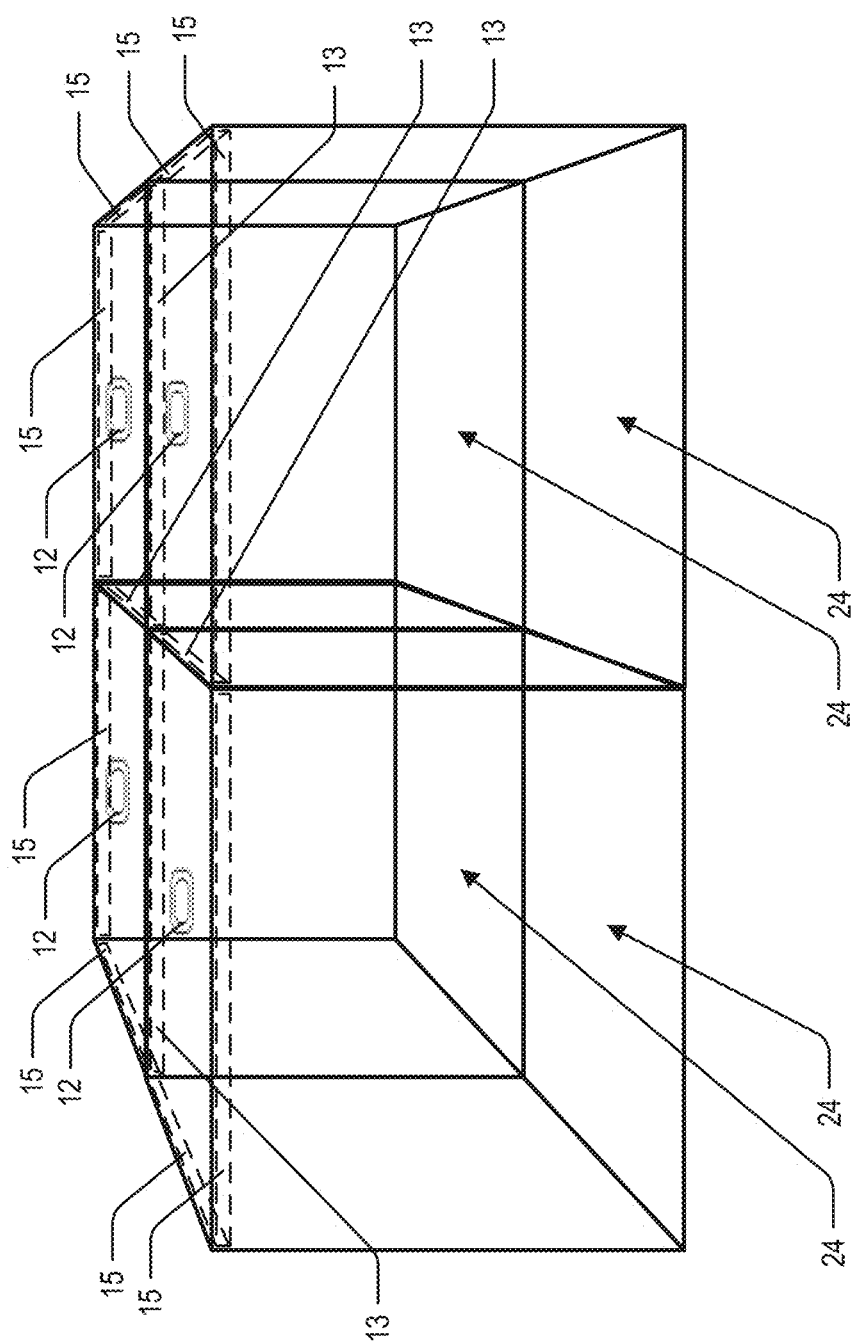
FIG. 4 is a space showing deployment of a system in accordance with the present disclosure.

Referring to FIG. 4, another exemplary aspect of the system 10 is illustrated. In this aspect, the space 24 is an area within an open floor plan and the open floor plan includes multiple spaces 24. The system 10 includes at least one space sensor 12 for each space 24. The space sensor 12 can be configured and positioned to provide sufficient coverage of each space 24. One or more boundary sensors 14 are mounted and configured to project one or more boundary fields 28 (not illustrated in this Fig. for ease of viewing, but would be projected along the vertical sides of each cube representing space 24) that cover at least a portion of the boundary of the space 24. In the illustrated aspect, the spaces 24 are square or block shaped and the boundary sensors 24 are configured to project the boundary fields 28 in a linear fashion along the edges of the square- or box-shaped spaces 24. In this case, the system 10 can utilize a single boundary sensor 14 to sense the boundary of multiple spaces 24, such as two neighboring spaces 24 that share a single boundary. The internal boundary sensors 13 are configured to monitor the boundary between two adjacent spaces 24 and the external boundary sensors 15 are configured to monitor the boundary between a space 24 and surrounding areas.

Figure 5:
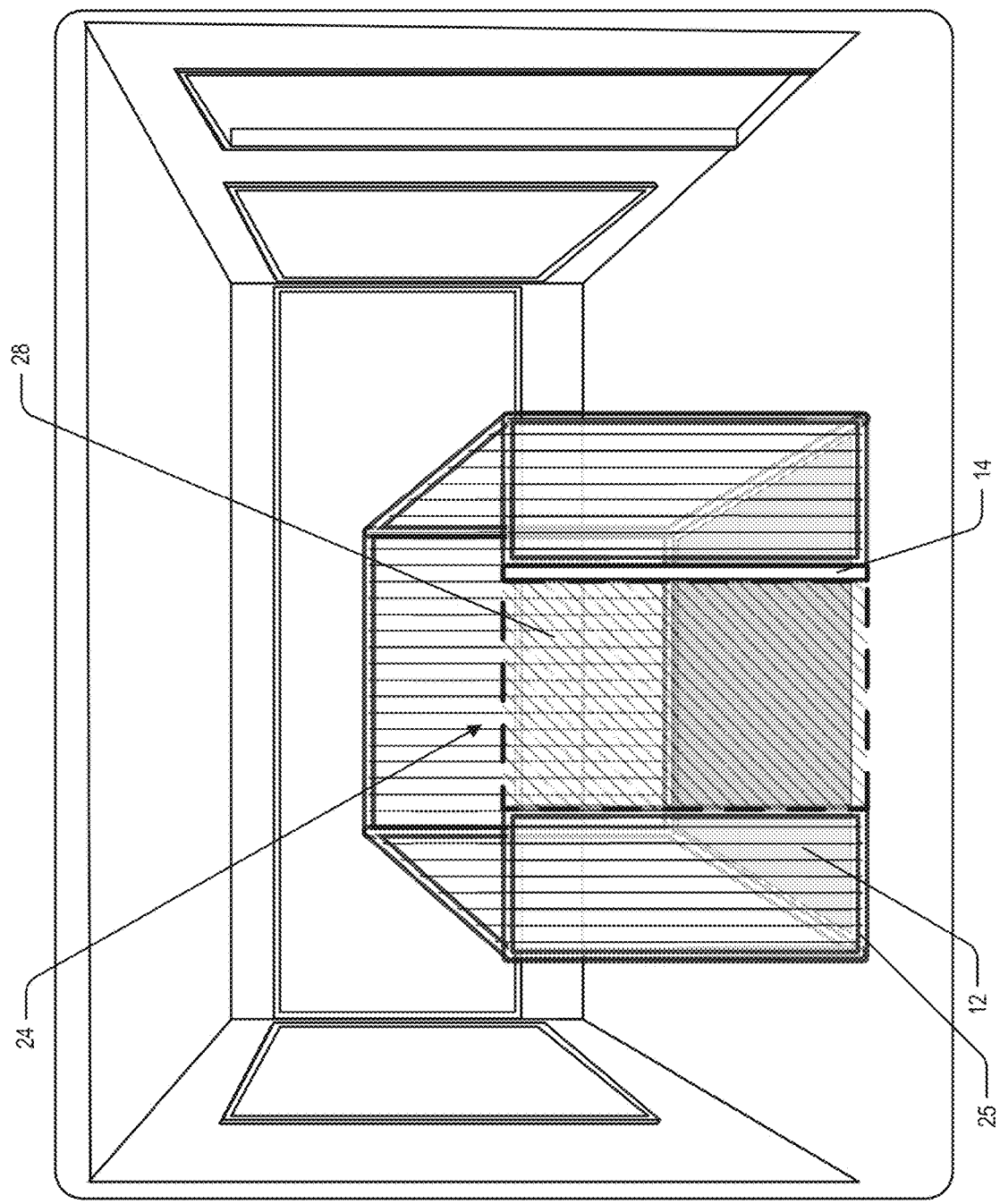
FIG. 5 a space showing deployment of a system in accordance with the present disclosure.

Referring to FIG. 5, another exemplary aspect of the system 10 is illustrated. In this aspect, the space 24 is a workstation bounded by partition panels 25, and the specifically illustrated aspect shows a cubicle. The system can include at least one area of volume sensor 12 for the space 24, such as the illustrated pressure-sensitive mat. One or more boundary sensors 14 can be mounted and configured to project one or more boundary field 28 across an entrance to the cubicle. In some cases, the one or more boundary sensors 14 can be positioned to only monitor movement through the entrance to the cubicle, while in other cases, the one or more boundary sensors 14 can be positioned to monitor movement between the tops of the partition panels 25 and the ceiling.

The space 24 can be a room, a workstation bounded by partition panels, such as personal semi-open working environment or a cubicle, an arbitrarily-defined area or volume, or another location where a determination of occupancy status is desired. It should be appreciated that, while the system 10 is described in the context of these spaces 24, the inventive concept of the present disclosure can be used in any occupancy determination context. The concepts are applicable not only to spaces 24, but any permanent object.

The system 10 can include one or more space sensors 12 positioned in the space or locations near to the space. The one or more space sensors 12 can be configured to monitor an area or a volume within the space 24. The one or more space sensors 12 can be oriented to monitor a portion of the space or the entire space. Examples of suitable space sensors 12 include, but are not limited to, passive infrared (PIR) sensors, floor pressure sensors, ultrasonic sensors, microwave sensors, other infrared sensors (e.g., thermopile, thermopile array, infrared camera, etc.), video sensors, acoustic sensors, and the like.

The space sensors 12 can be battery operated. In some cases, the systems and methods described herein can extend battery lifetime by reducing the amount of communication signals necessary to make an occupancy determination.

In cases where a single space sensor 12 is deployed, the space sensor 12 can be configured to provide high coverage of the space 24, such as at least 90%, at least 95%, or at least 99% coverage of the space 24, or low coverage of the space 24, such as at most 50%, at most 25%, or at most 10% coverage of the space 24.

In cases where multiple space sensors 12 are deployed, the layout of the space sensors can be configured to provide high coverage of the space, such as at least 90%, at least 95%, or at least 99% coverage of the space, or low coverage of the space, such as at most 50%, at most 25%, or at most 10% coverage of the space 24.

It should be appreciated that the coverage described here is not only suitable for the function of the present disclosure, but in fact, the present disclosure contemplate low coverage situations where occupancy can still be accurately determined.

It should be appreciated that some space sensors 12 can have "soft edges" to the area of coverage they provide. For example, 70% of a space can be covered extremely well, 20% can be covered somewhat well, and 10% can be covered poorly. For the purposes of defining coverage in the space sensor 12 context, a space sensor 12 can be considered to cover a volume if the space sensor 12 detects motion of a hand-sized object moving back and forth over a distance of 0.5 meters.

In certain cases, the space sensor 12 can be a motion sensor that senses motion within the space.

In certain cases, the space sensor 12 can be a pressure sensor, for example a floor or mat that is pressure sensitive, which senses pressure in a floor located in the space.

In certain cases, the space sensor 12 can be an ultrasonic or Doppler sensor.

The space 24 can have a boundary. In some cases, the boundary is defined by a door or other passageway, ingress, egress, or the like. In other cases, the boundary is an arbitrarily-defined area.

The system can include one or more boundary sensors 14 positioned and configured to monitor penetration of at least a portion of the boundary. Examples of suitable boundary sensors 14 include, but are not limited to, curtain sensors, such as optical curtain sensors or magnetic curtain sensors, break-beam (also known as, "electric eye") sensors, other infrared curtain sensors (e.g., thermopile, thermopile array, infrared camera, etc.), video sensors, and the like.

In certain cases, the one or more boundary sensors 14 can be configured to provide at least 90%, at least 95%, or at least 99% coverage of the boundary of the space. For the purposes of defining coverage in the boundary sensor 14 context, a boundary sensor 14 can be considered to cover an area of the boundary if the boundary sensor 14 detects movement of a golf ball sized object through the boundary.

The boundary sensors 14 can in some instances be directional boundary sensors that can sense the direction of movement through the boundary. For example, if two boundary sensors 14 are placed on the boundary with a very small distance separating the boundary sensors 14, then the small difference in timing between sensing penetration can be used to determine the direction of travel.

The space sensors 12 and boundary sensors 14 can be configured to communicate via a low energy consumption communication protocol, such as Bluetooth®, including Bluetooth® 4.0, Bluetooth® 4.1 Bluetooth® 4.2, Bluetooth® 5.0, Bluetooth® LE, and Bluetooth® Smart, IEEE802.15.4 (ZigBee®, 6LoWPAN, Thread®), via IEEE802.11 (WiFi), and the like. Of course, this protocol can be used with other, later issued low energy consumption communication protocols, as well as with other communication protocol specifications.

The system can include one or more gateways 16 configured to send signals to and receive signals from the one or more space sensors 12 and the one or more boundary sensors 14. In instances where the one or more gateways 16 include at least two gateways 16, the at least two gateways 16 can be configured to communicate with one another via a low energy consumption communication protocols, such as Bluetooth®, via IEEE802.3 Ethernet, via IEEE802.11 (WiFi), and the like.

In some cases, the sensors 12, 14 can be integrated into a single unit. For example, a single unit residing above a door could monitor a space using a space sensor 12 and simultaneous monitor penetration of the door using a boundary sensor.

In some cases, the sensors 12, 14 and the communication capabilities of the gateway 16 can be integrated into a single unit.

The system can include a processor 18 and a memory 20 that are in wired or wireless electronic communication with the gateway 16. The processor 18 and memory 20 can be integrated into the gateway 16 or can be remote from the gateway 16. In some cases, the processor 18 and memory 20 can be housed within the same facility as the sensors 12, 14 and gateway 16. In other cases, the processor and memory can be housed within a different facility than the sensors and gateway. For example, the processor 18 and memory 20 can be cloud computing systems.

The processor 18 can be configured to communicate with the gateway via a low energy consumption communication protocol, such as Bluetooth®, via IEEE802.3 Ethernet, via IEEE802.11 (WiFi), and the like.

The one or more space sensors 12, one or more boundary sensors 14, one or more gateways 16, and processor 18 can be configured to execute a system communication protocol. For the simplicity of explanation, all space sensors 12 and boundary sensors 14 shall be referred to herein as "endpoints". The system communication protocol will be described in some aspects using a singular endpoint and a singular gateway, but the concepts are applicable to multiple endpoints and gateways, unless the context clearly dictates otherwise.

The system communication protocol can include a heartbeat signal that is transmitted from the endpoint. The heartbeat signal serves the function of confirming that communication is functioning as intended between the endpoint and the gateway. The gateway can be configured to receive the heartbeat signal. Upon receipt of the heartbeat signal, the gateway can be configured to send a heartbeat acknowledgment signal. If the gateway is busy at the time of receipt of the heartbeat signal, the gateway may delay delivery of the heartbeat acknowledgment signal or may ignore the heartbeat signal altogether. In some cases, the heartbeat signal may simply go undetected by a gateway. The system communication protocol is configured to accommodate for either of these instances using the signal reiteration protocol described below.

The system communication protocol can be configured to cause the endpoint to transmit the heartbeat signal after a given length of time has passed since either the previous heartbeat signal or an event signal (discussed below). In other words, an event signal transmission can reset the waiting time for sending another heartbeat signal. Alternately, the system communication protocol can be configured to cause the endpoint to transmit the heartbeat signal at regular intervals, regardless of the detection of an event.

The system protocol can include an event signal that is transmitted from the endpoint when an event is sensed. In the case of the space sensor, the event signal can be sent in response to detection of an event that corresponds to occupancy (i.e., motion or sensed weight). The gateway can be configured to receive the event signal. Upon receipt of the event signal, the gateway can be configured to send an event acknowledgement signal. Again, if the gateway is busy at the time of receipt of the event signal, the gateway may delay delivery of the event acknowledgment signal or may ignore the event signal altogether. In some cases, the event signal may simply go undetected by the gateway. The system communication protocol is configured to accommodate for either of these instance using the signal reiteration protocol described below.

The endpoint can be configured to use a signal reiteration protocol. For the simplicity of description, the heartbeat signals and event signals shall be referred to generically as signals in this description, but it should be apparent that the features are applicable in either instance. The endpoint can be configured to periodically transmit one or more reiterated signals at given time points following the first signal. Each of the transmitted signals has encoded within it information corresponding to the timing of that signal relative to the first signal. Using this information, the gateway and/or the processor can determine the timing of the first signal (i.e., the timing of the heartbeat or the timing of the event).

In some cases, the reiterated signals are encoded with a time stamp relative to the first signal. For example, if the first signal is sent at 3:00:00 PM and the first reiterated signal is sent at 3:00:30 PM, then the first signal can have a time stamp of 0:00 and the first reiterated signal can have a time stamp of 0:30. It should be appreciated that the time stamp can take any form that suitably represents the relative timing.

In some cases, the reiterated signals are encoded with a counter representing that signal's relative position in the sequence of reiterated signals. In other words, the signals can use an interval counter with a known interval. In this case, the gateway and/or processor can be programmed with the periodicity of the reiterated signals (i.e., the length of time between signals), so the relative timing can be determined mathematically by knowing which signal in the sequence was detected. For example, the first signal can be given a counter of 0, the first reiterated signal can be given a counter of 1, the second signal can be given a counter of 2, . . . and the nth reiterated signal can be given a counter of n. If the periodicity is set at 5 seconds and the gateway senses a signal having a counter of 10, then the gateway and/or processor can be configured to calculate that the first signal occurred 50 seconds prior to the sensing of the signal having a counter of 10.

The periodicity of the reiterated signals can be set for a given use case by a system administrator. In some cases, where fast sensing of occupancy is at a premium, the periodicity can be set to a short time value. In some cases, where the timing of the occupancy determination is less sensitive and the energy efficiency of the system (i.e., battery life) is more important, the periodicity can be set to a longer time value.

The reiterated signal protocol can be configured to have a maximum number of reiterated signals. This value can be set for a given use case by a system administrator.

The endpoints can be configured to operate in a provisioning mode, where the endpoints are searching for an appropriate gateway to pair with for the communication of signals. The provisioning mode can include sending a gateway identification signal from the endpoint. The gateway can be configured to receive the gateway identification signal and send an acknowledgement signal to the endpoint. Once the gateway identification signal has been processed, the endpoint and gateway can be paired with one another.

As described above, the endpoint signal transmission can be reiterated until a maximum number of reiterations occurs. In cases where the maximum number has been met, the endpoint can enter provisioning mode, thus resuming the search for an appropriate gateway for pairing.

Figure 6:
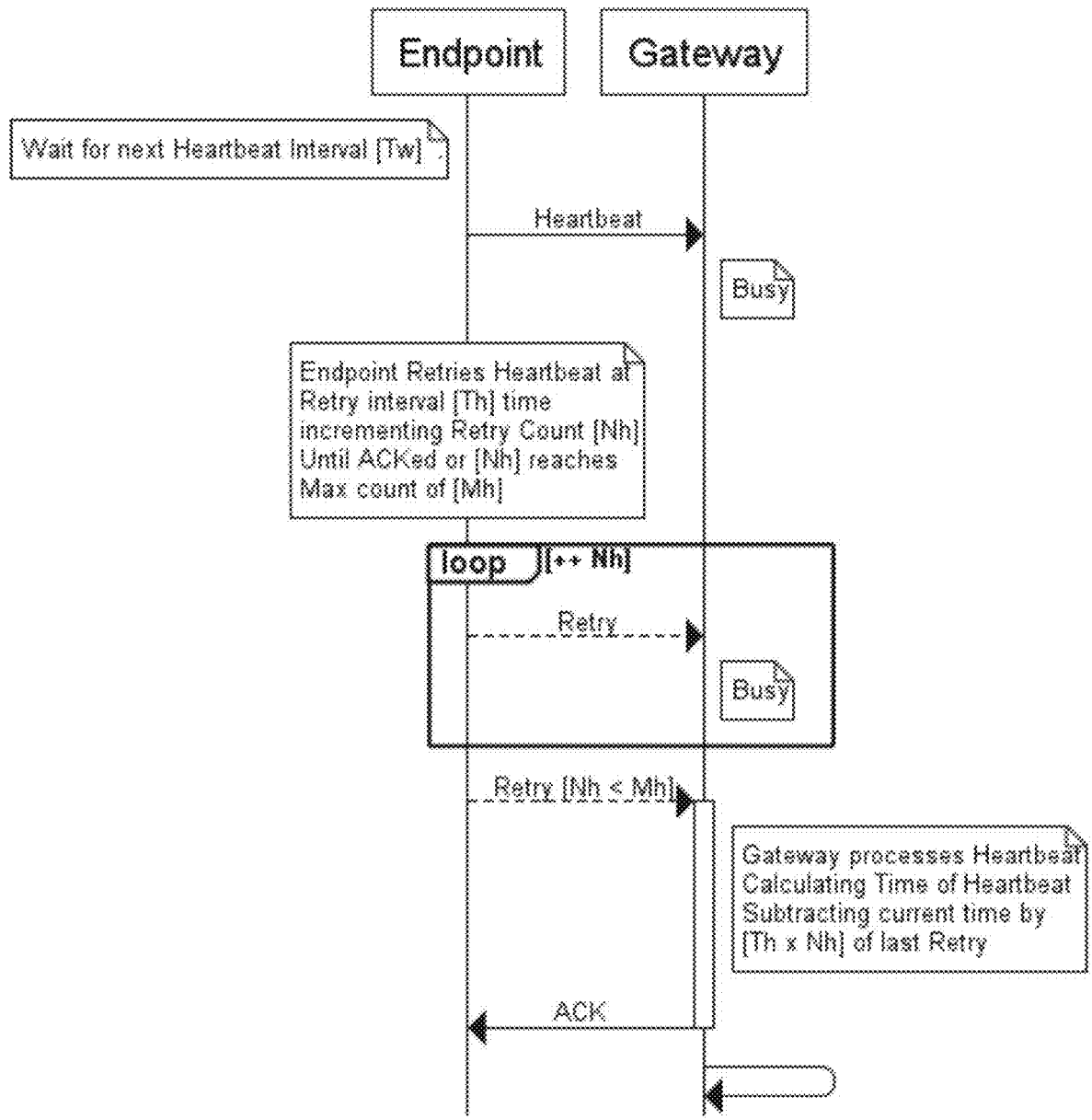
FIG. 6 is the first part of a three part flow diagram illustrating a system communication protocol in accordance with the present disclosure.
Figure 7:
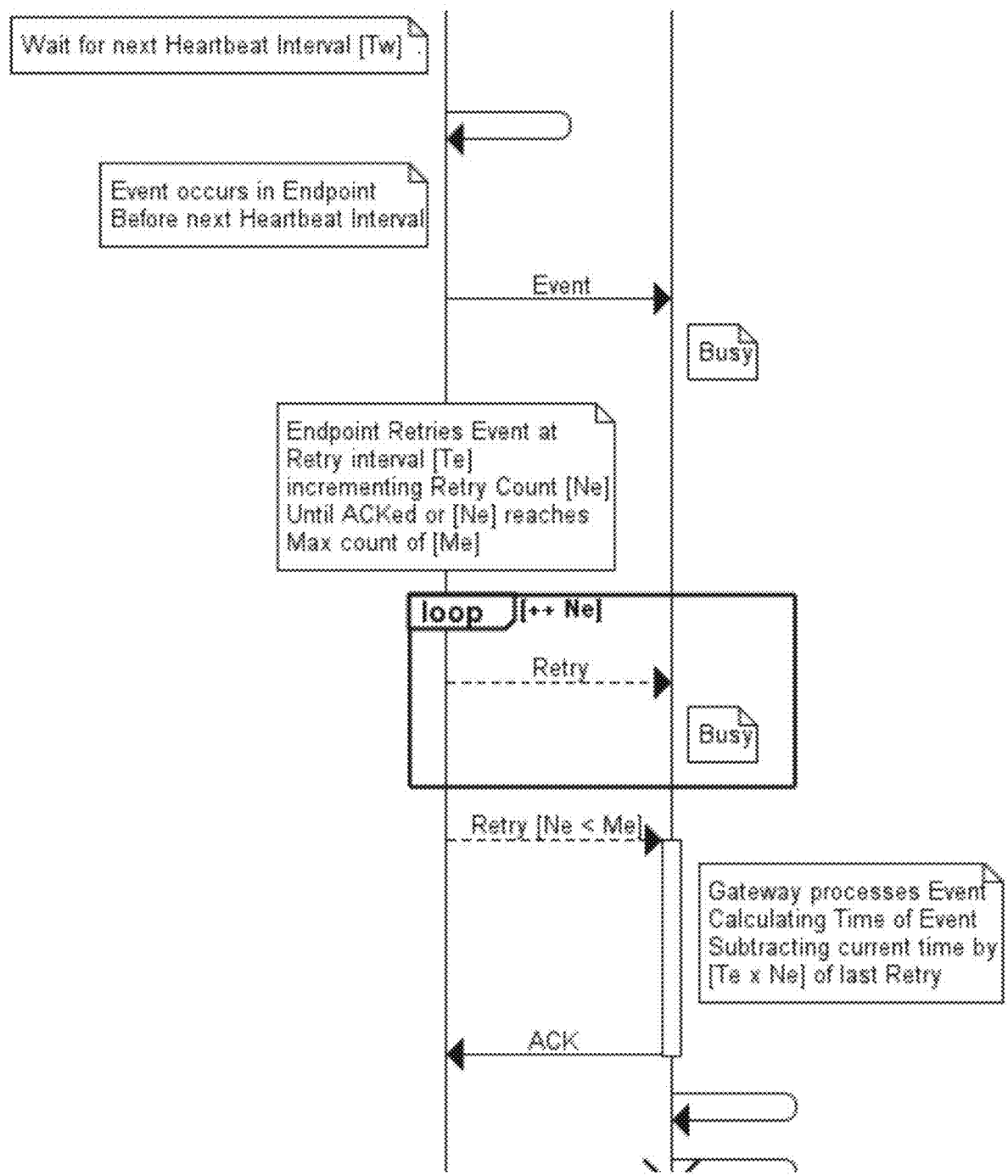
FIG. 7 is the second part of a three part flow diagram illustrating a system communication protocol in accordance with the present disclosure.
Figure 8:
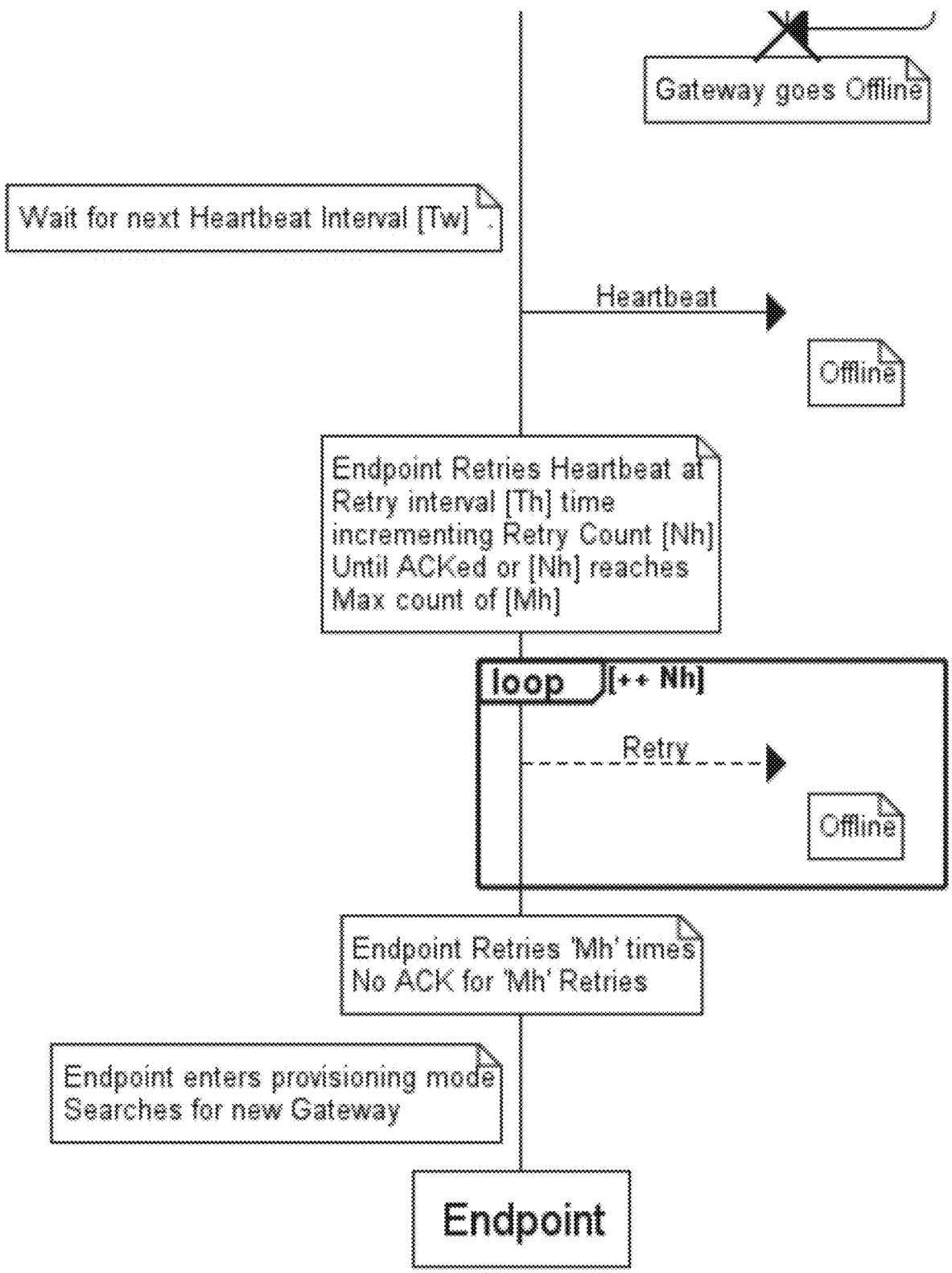
FIG. 8 is the third part of a three part flow diagram illustrating a system communication protocol in accordance with the present disclosure.

Referring to FIGS. 6-8, a schematic flowchart representation of the system communication protocol is shown. The bottom of FIG. 6 continues to the top of FIG. 7. The bottom of FIG. 7 continues to the top of FIG. 8.

The transmission of the various signals described herein need not be directed to any particular recipient and can simply be broadcast into the areas surrounding the endpoint. This broadcasting capability can reduce energy consumption, because it eliminates the need for establishing and maintaining continuous lines of communication.

In cases where two different gateways are within range of a given endpoint, the endpoint can selectively pair with one gateway to have priority over the other gateway in receiving signals from that given endpoint. In these cases, the non-priority gateway can be programmed to ignore signals from that given endpoint. Alternately, the two gateways can be configured to each receive the signals form the endpoint and to communicate with one another to confirm that the signals are not being processed more than once.

This disclosure also provides methods of determining occupancy status of a space.

Using the system communication protocols discussed above, the systems described herein can execute a method of determining occupancy status of a space. The methods can include receiving an occupancy signal from the space sensor and a penetration signal from the boundary sensor.

Signals such as those described herein can be correlated with one another in a variety of ways. Signals have a rising edge and falling edge. For example, using a square wave signal as an example, the rising edge is the "left" side of the signal (i.e., the part of the signal that occurs first in time) and the falling edge is the "right" side of the signal (i.e., the part of the signal that occurs last in time). There are also other signal landmarks that can generally be used in comparing signals, such as the average of the rising edge and falling edge, a maximum for non-square wave signals, a point on a signal that first exceeds a given threshold, and a variety of other signal landmarks known to those having ordinary skill in the art.

In one exemplary aspect, the falling edges of the signals described herein are used for one method of determining occupancy status of a space.

In certain cases, the method of determining occupancy status of a space can include one or more of the following steps: a) receiving one or more passive signals from one or more space sensors, the one or more passive signals corresponding to presence or movement in the space; b) receiving one or more boundary signals from one or more boundary sensors, the boundary signals corresponding to movement into or out of the space; and c) in response to receiving, within a first time period of one another, a first falling edge of a passive signal from the one or more space sensors and a second falling edge of a boundary signal (for clarity, the use of "second" here is to distinguish from the first falling edge of the passive signal, not to indicate that the falling edge used here is the second occurrence of a falling edge) from the one or more boundary sensors, providing an indication that the space is not occupied.

In some cases, the passive signal can include a time out length of time before the passive signal indicates a lack of presence, such that the first falling edge of the passive signal occurs later than the last sensed motion, pressure, or other characteristic being monitored. The difference between the last sensed motion, pressure, or other characteristic being monitored and the first falling edge of the passive signal is the time out length of time.

In some cases, the method can include grouping the first falling edge and the second falling edge into timing bins, where the method proceeds in making an occupancy determination based on a protocol that is selected as a result of the timing bin in which the falling edges are located.

In some cases, the method can utilize two timing bins, three timing bins, four timing bins, and so on, up to "N" timing bins. The bins can be symmetrical (i.e., it does not matter which signal comes first) or can be asymmetrical (i.e., the bin can be one size when one signal comes first and a different size when a different signal comes first).

As one example, a first bin can include the two falling edges occurring within under 7 seconds relative to one another, a second bin can include the two falling edges occurring within under 10 seconds relative to one another but outside the first bin, a third bin can include the two falling edges occurring within under 20 seconds relative to one another but outside the first and second bin, and a fourth bin can include the two falling edges occurring in 20 seconds or more relative to one another. In this example, the first bin includes cases having the highest confidence that the last person has left the space, the second bin includes cases having less confidence that someone has left the space, the third bin includes cases having even less confidence that someone has left the space, and the fourth bin includes cases having the lowest confidence that the last person has left the space.

Following the detection of the two falling edges within a given time relative to one another, the method can include waiting a predetermine period of time to confirm that the space is empty. The bins described above can be utilized to provide the shortest waiting time for the bin with the most confidence (i.e. the first bin) and longer waiting times for decreasing confidence (i.e., longer waiting time for the second bin, even longer waiting time for the third bin, and the longest waiting time for the fourth bin). During the waiting time, the method includes monitoring the space sensors for a subsequent passive signal indicating that the space remains occupied. If the subsequent passive signal does not occur during the waiting time, the method can provide an indication that the space is not occupied. For example, falling edges categorized in the first bin above can be followed by a three minute waiting time, falling edges categorized in the second bin above can be followed by a five minute waiting time, falling edges categorized in the third bin above can be followed by an eight minute waiting time, and falling edges categorized in the fourth bin above can be followed by a twenty-five minute waiting time.

The specific time values described herein are exemplary only and are not intended to be limiting. The time values can include signal time out times. For example, the three minute waiting time described above can include two minutes to account for the time out and one minute of extra waiting to ensure non-occupancy.

In certain cases, the timing for the bins described above and the waiting time described above can be optimized for a given group of users or a given space. For example, a searching algorithm can be run on a collected data set in order to optimize the number of bins, the timing for the bins, and the waiting time. It should be appreciated that a given entity might require a higher confidence level for its determinations of non-occupancy than another entity and the various times can be adjusted based on that required confidence level.

In certain cases where one or more gateways are used, the method of determining occupancy status of a space can include one or more of the following steps: a) monitoring, using one or more gateways, passive signals from one or more space sensors, the passive signals corresponding to presence or movement in the space; b) monitoring, using the one or more gateways, boundary signals from one or more boundary sensors, the boundary signals corresponding movement into or out of the space; and c) in response to receiving, within a predetermined time period of one another, a first falling edge of a passive signal from the one or more space sensors and a second falling edge of a boundary signal from the one or more boundary sensors, providing an indication that the space is not occupied.

It should be appreciated that the determination of signal timing described above is particularly useful for determining when the falling edges of given signals occur. Thus, even if the signals are not immediately received, or if one of the signals is received and the other is missed, the proper timing determination can still be made. It should be appreciated that other methods of determining signal timing can be used with the methods described herein.

The first falling edge of a passive signal is essentially an indication from the space sensor that the space is unoccupied. As discussed above in the background with respect to room lights, this signal on its own can be unreliable in determining the occupancy status of a room. To account for this shortcoming, the method monitors a second falling edge of a boundary signal, which is essentially an indication from the boundary sensor that something (or more specifically, someone) has passed through an egress to the space. Using the boundary sensor signal on its own would also be unreliable in determining the occupancy status of a room, because it might be unclear whether a person is entering the room or exiting the room. The inventors surprisingly discovered that using the falling edges of these signals in combination provides a robust occupancy determination.

The occupancy determination can be used in a variety of ways. As one example, the determination of occupancy can be used for room reservations, including complex scheduling algorithms that adjust a schedule based on the occupancy status of a room. As another example, the determination of occupancy can be used for control of room affordances, such as lighting, security, HVAC, or other environmental controls.

It should be appreciated that the spaces described herein can contain a variety of other sensors, such as sensors positioned within affordances, such as chairs and worksurfaces, environmental sensors, sensors configured to determine a status of a device within the space, such as a presentation system, a computer, a personal device, or the like, or other sensors that can provide usage data which can be associated with the space or a user of the space. These other sensors can provide usage data that can supplement the occupancy determinations described herein. For example, if a presentation system can provide usage data corresponding to the active use of the presentation system (i.e., a user is actively changing slides in a presentation), then this usage data corresponding to the active use of the presentation system can be used to supplement or override an occupancy determination.

In a specific example of the room reservation use case for the occupancy determination, if a given user has reserved a room from 1:00 to 3:00, then the scheduling algorithm can be configured to use the determination of occupancy to cancel that reservation if the room is determined to be unoccupied for 15 minutes from 1:00 to 3:00. The specific rule set can be chosen by a given user or organizational entity in order to best optimize the scheduling algorithm. For example, one or more unoccupied determinations within a given time period can trigger cancelation of a reservation or multiple occupied determinations can have the opposite effect of initiating a reservation.

In a specific example of the room affordance control use case for the occupancy determination, a facility control algorithm can use the occupancy determination to turn lights off or turn heating or air conditioning off after an unoccupied determination. Alternately, an occupied determination can trigger the activation of lights or environmental control. The rules for controlling affordances ben be chosen based on the preferred outcomes. For example, if a highly energy efficient lighting system is desired, then a single unoccupied determination can prompt the lights to be turned off. On the other hand, if a facility wishes to prevent the mistaken switching off of lights, despite the higher cost of electricity required, then multiple unoccupied determinations can be required before turning the lights off.

It should be appreciated that these examples of use of the occupancy determination are merely illustrative and should not be interpreted as limiting the scope of the claims except to the extent that any specific features of the examples are incorporated into the claims themselves.

FIGS. 9-13 are plots representing signals according to the example described above with respect to the first, second, third, and fourth bins. The plots denoted as "room sensors" correspond to space sensors and the plots denoted as "curtain sensor" correspond to boundary sensors. The y-axis is an arbitrary signal intensity and the x-axis is time in seconds. The plots are being used in a room reservation context, so the determination of non-occupancy results in a room being "released" for others to use.

Figure 9:
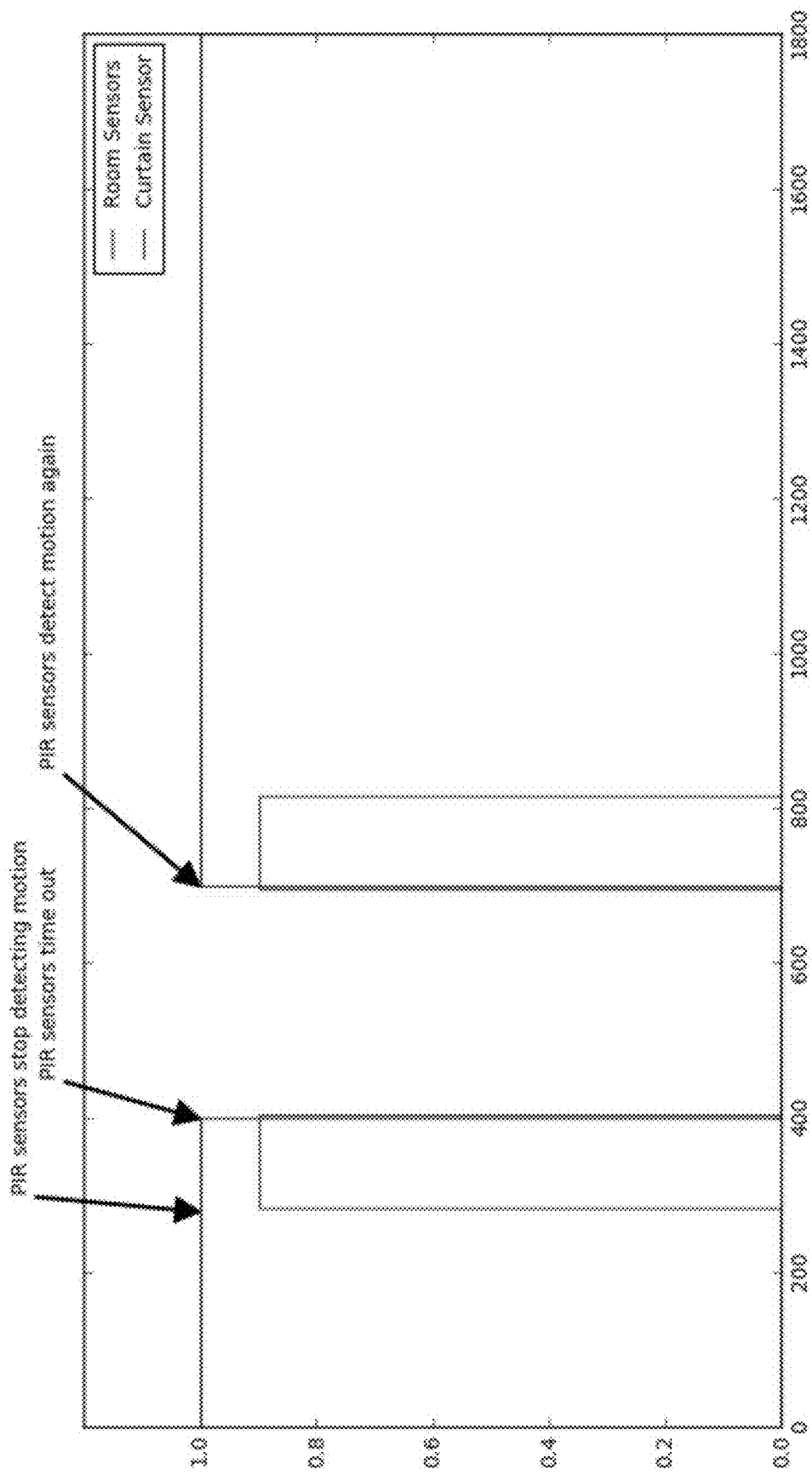
FIG. 9 is a plot representing signals used in a method in accordance with the present disclosure.

FIG. 9 illustrates a case where there is a time out for the space sensors, such that there is a delay between the last sensed motion and the falling edge of the room sensors signal.

Figure 10:
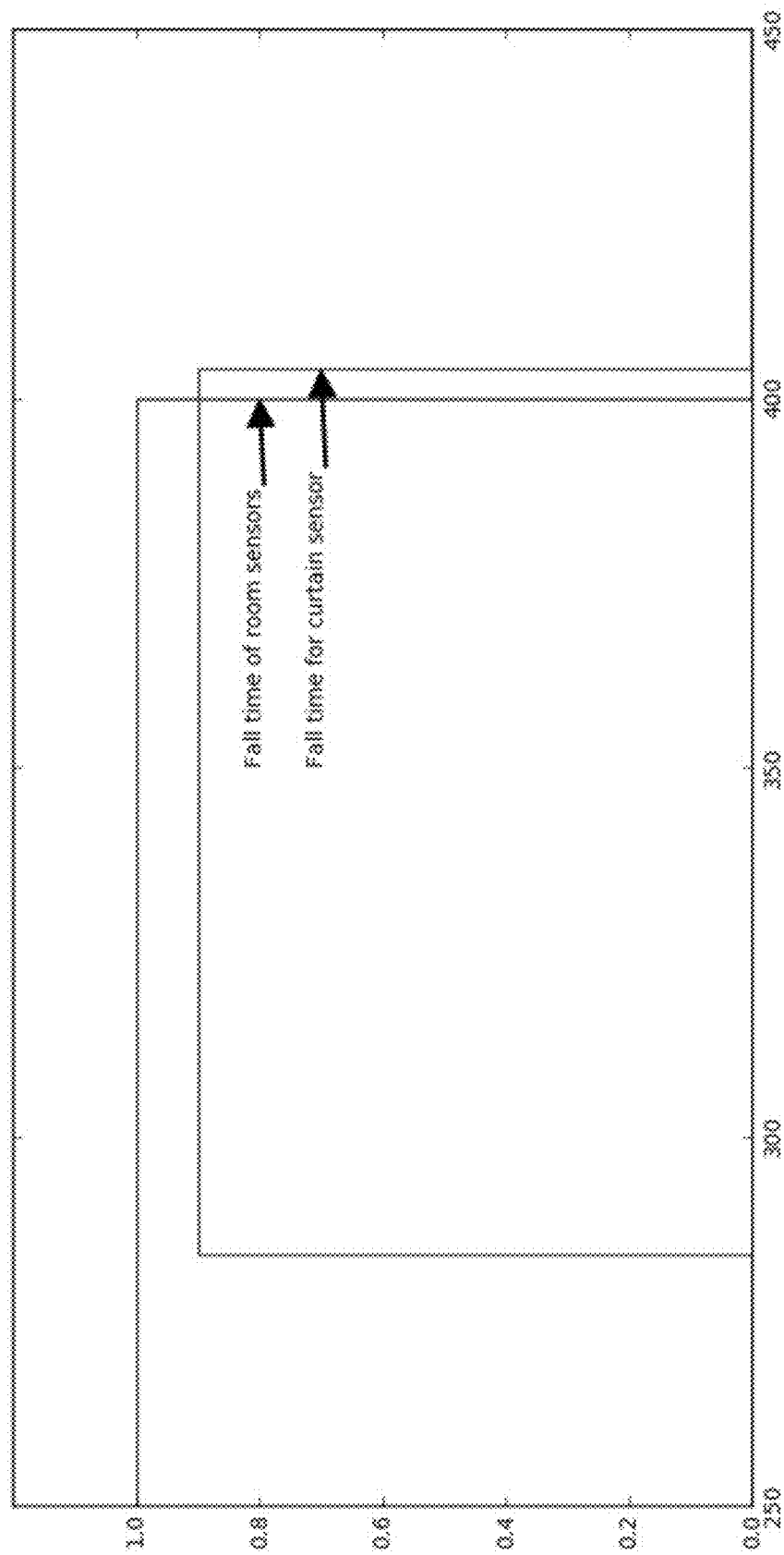
FIG. 10 is a plot representing signals used in a method in accordance with the present disclosure.
Figure 11:
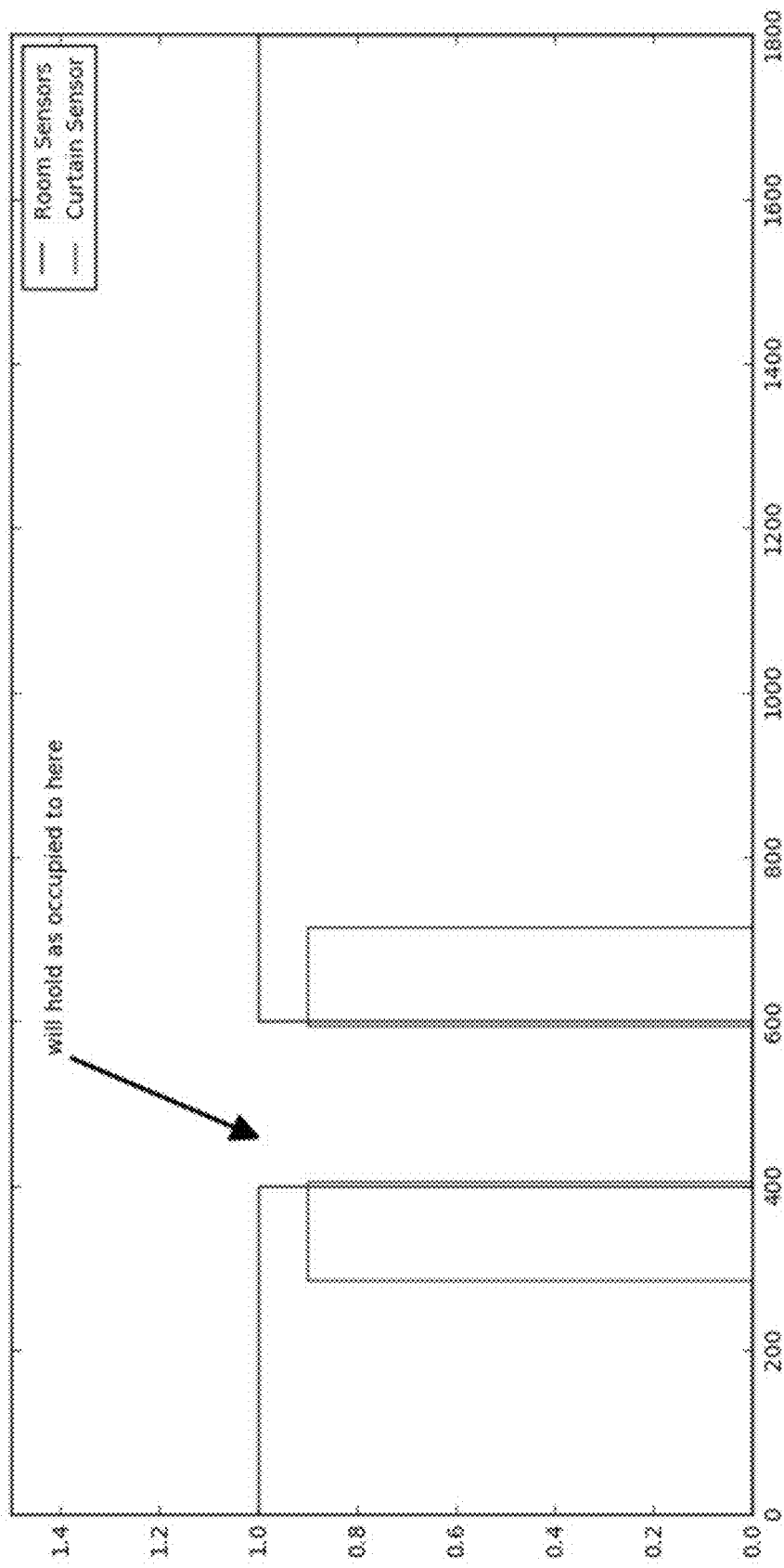
FIG. 11 is a plot representing signals used in a method in accordance with the present disclosure.

FIG. 10 is a zoomed view of two falling edges separated by 6 seconds. Per the protocol above, the waiting time is three minutes (or one minute plus two minutes of time out time). If no new signal is detected within the waiting time, the room is deemed unoccupied and released for a new reservation. The one-minute mark is denoted by the arrow indicating "will hold as occupied to here". No new signals were observed during this window, so the room is deemed unoccupied and released for a new reservation.

Figure 12:
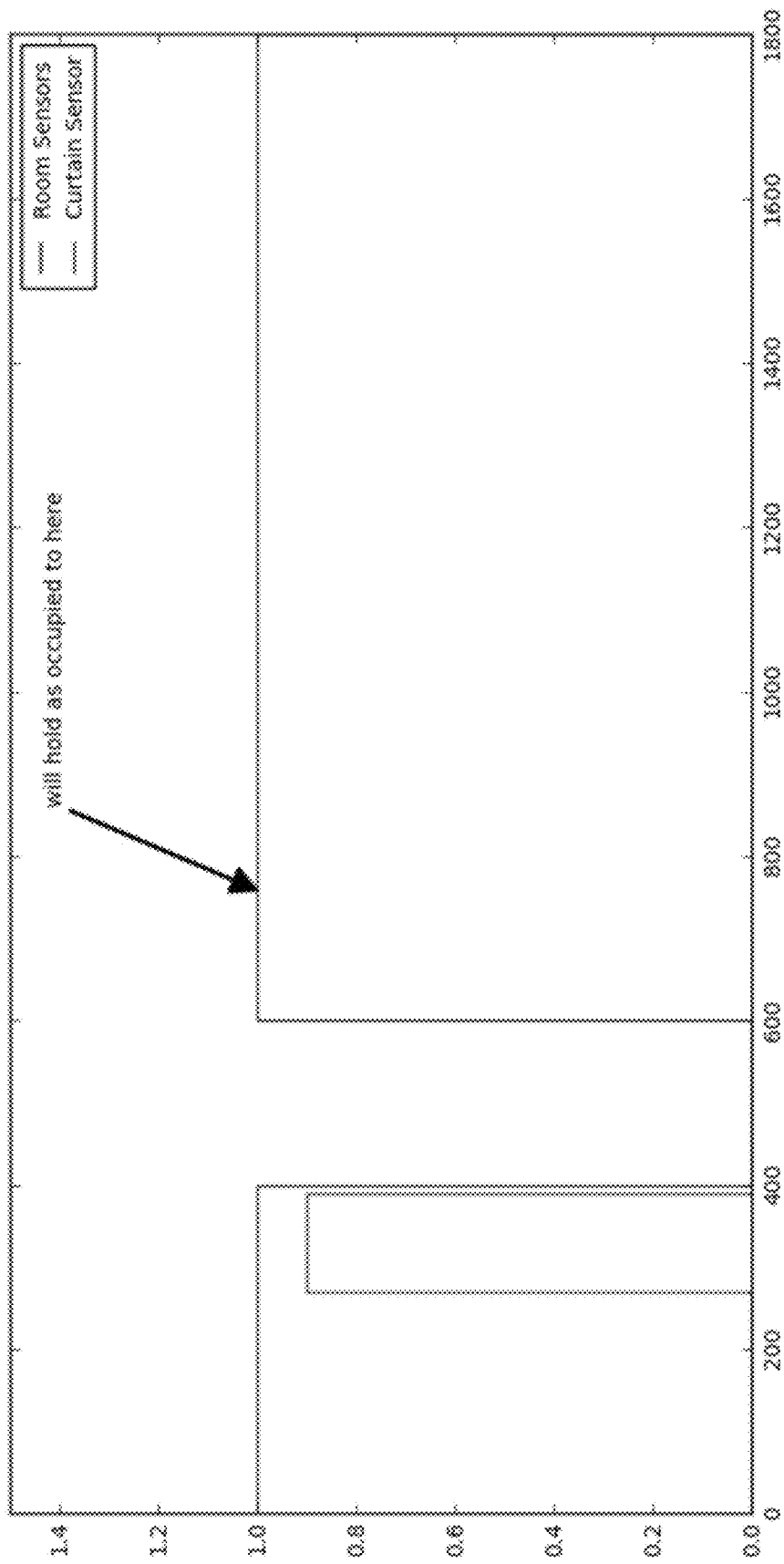
FIG. 12 is a plot representing signals used in a method in accordance with the present disclosure.

FIG. 12 shows the two falling edge signals being separated by 11 seconds. Per the protocol above, the waiting time is eight minutes (or six minutes plus two minutes of time out time). If no new signal is detected within the waiting time, the room is deemed unoccupied and released for a new reservation. The six-minute mark is denoted by the arrow indicating "will hold as occupied to here". Because a new signal was observed during this window, the room is not deemed unoccupied and is not released for a new reservation.

Figure 13:
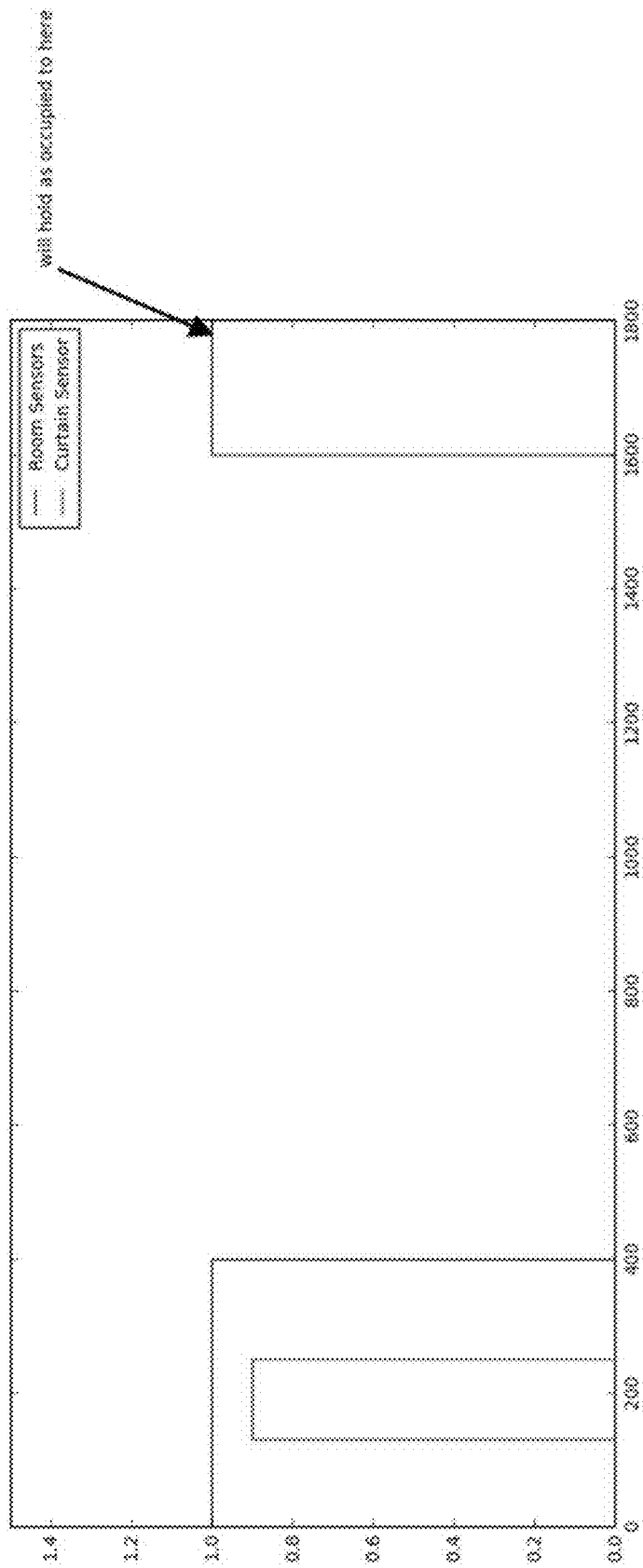
FIG. 13 is a plot representing signals used in a method in accordance with the present disclosure.

FIG. 13 shows the two falling edge signals being separated by 150 seconds. Per the protocol above, the waiting time is twenty-five minutes (or twenty-three minutes plus two minutes of time out time). The twenty-three minute mark is denoted by the arrow indicating "will hold as occupied to here". Because a new signal was observed during this window, the room is not deemed unoccupied and is not released for a new reservation.

This disclosure also provides methods of provisioning a system such as the systems described herein. The method of provisioning a system can include one or more of the following steps: a) generating a floorplan representing a space; b) generating placement of one or more sensors and one or more gateways within the floorplan; c) delivering the one or more gateways to an information technology installer at the space; d) selecting the number and type of sensors based on the generated placement of step b); e) entering the number and type of sensors into a database; f) packaging the one or more sensors with installation diagrams; g) delivering the packaged one or more sensors to the space; h) mounting the sensors in the space based on the installation diagrams; and i) entering provisioning mode with the sensors.

The generating a floorplan of step a) can include automatic or manual floorplan generation. In certain cases, blueprints of the space can be used as the floorplan.

The generating placement of step b) can be done by a software algorithm that considers the coverage of sensors, the range of sensors and gateways, a desired coverage of the sensors, and other factors that may impact performance of the system.

The delivering the one or more gateways to an information technology installer at the space of step c) can include instructions to the information technology installer regarding how to integrate the one or more gateways into the network system at the space.

The selecting the number and type of sensors of step d) (which is based on the generated placement of step b) can include a specialist using the output from the software algorithm to perform a more refined selection process.

The entering the number and type of sensors into a database of step e) can include any database entry methods known to those having ordinary skill in the art, including but not limited to, barcode scanning the desired type of sensors a desired number of times, selecting the sensors and numbers from a digital shopping environment, and the like.

The packaging the one or more sensors with installation diagrams of step f) can include a picture showing where each sensor is intended to be installed. In some cases, the one or more sensors can be divided into the groups of sensors based on the rooms in which the sensors will be installed. For example, if room A has 2 space sensors and 1 boundary sensor and room B has 3 space sensor and 2 boundary sensors, the packaging of step f) can prepare two boxes, one with 2 space sensors and 1 boundary sensor and another with 3 space sensors and 2 boundary sensors.

The delivering of step g) can be achieved by conventional delivery means known to those having ordinary skill in the art.

The mounting of step h) can be performed by someone other than an information technology installer.

The entering provisioning mode of step i) can be initiated locally or remotely.

In certain cases, the method can include confirming that the sensors and gateways are properly installed and aligned. This confirming can be done remotely from the space.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

We claim:

1. A method of detecting occupancy of a space, the method comprising:
   a) receiving one or more passive signals from one or more space sensors, the one or more passive signals corresponding to sensing presence or movement in the space, the one or more passive signals each having a passive signal falling edge that occurs when the one or more space sensors cease sensing presence or movement in the space;
   b) receiving one or more boundary signals from one or more boundary sensors, the one or more boundary signals corresponding to detecting movement into or out of the space, the one or more boundary signals each having a boundary signal falling edge that occurs when the one or more boundary sensors cease detecting movement into or out of the space; and
   c) in response to receiving, within a first pre-determined time period of one another, the passive signal falling edge and the boundary signal falling edge, providing an indication that the space is not occupied.

2. The method of claim 1, the method further comprising monitoring, using one or more gateways, passive signals from the one or more space sensors and boundary signals from the one or more boundary sensors.

3. The method of claim 1, wherein the space is a room or an arbitrarily-defined area or volume.

4. The method of claim 1, wherein the one or more space sensors include an infrared sensor, a floor pressure sensor, an ultrasonic sensor, a microwave sensor, a video sensor, an acoustic sensor, or a combination thereof.

5. The method of claim 1, wherein the one or more space sensors include a passive infrared sensor.

6. The method of claim 1, wherein the one or more space sensors are configured to provide at least 90% coverage of the space.

7. The method of claim 1, wherein the one or more space sensors include a motion sensor that senses motion within the space.

8. The method of claim 1, wherein the one or more boundary sensors are configured to sense movement through a boundary of the space.

9. The method of claim 8, wherein the boundary includes a door, a passageway, an ingress, an egress, an arbitrarily defined boundary area, or a combination thereof.

10. The method of claim 8, wherein the one or more boundary sensors are configured to cover at least 90% of the boundary of the space.

11. The method of claim 1, wherein the one or more boundary sensors include an optical curtain sensor, a magnetic curtain sensor, a break-beam sensor, an infrared curtain sensor, a video sensor, or a combination thereof.

12. The method of claim 1, wherein the one or more boundary sensors are configured to sense directionality of movement into or out of the space.

13. The method of claim 1, wherein the one or more space sensors and/or the one or more boundary sensors are configured to communicate via a low energy consumption communication protocol or via a wireless communication protocol.

14. A method of controlling one or more affordances within a space, the method comprising the method of claim 1, and further comprising controlling the one or more affordances based on the indication that the space is not occupied.

15. The method of claim 14, wherein the one or more affordances include lighting, environmental control, or a combination thereof.

16. A system for detecting occupancy of a space, the system comprising:
- a space sensor aimed toward at least a portion of the space, the space sensor configured to sense movement or presence within the at least a portion of the space;
- a boundary sensor positioned to detect movement into and out of the space for at least a portion of a boundary of the space;
- a processor in electronic communication with the space sensor and the boundary sensor, the processor configured to send signals to and receive signals from the space sensor and the boundary sensor;
- a memory accessible by the processor and having stored thereon instructions that, when executed by the processor, cause the processor to perform the following steps:
    monitor the received signals; and
    in response to a passive signal falling edge of a passive signal received from the space sensor and a boundary signal falling edge of a boundary signal received from the boundary sensor occurring within a predetermined time of one another, indicate that the space is not occupied, wherein the passive signal falling edge occurs when the space sensor ceases sensing movement or presence within the at least a portion of the space, and
wherein the boundary signal falling edge occurs when the boundary sensor ceases detecting movement into and out of the space.

17. The system of claim 16, wherein the space is a room or an arbitrarily-defined area or volume.

18. The system of claim 16, wherein the one or more space sensors include an infrared sensor, a floor pressure sensor, an ultrasonic sensor, a microwave sensor, a video sensor, an acoustic sensor, or a combination thereof.

19. The system of claim 16, wherein the one or more space sensors include a passive infrared sensor.

20. The system of claim 16, wherein the instructions, when executed by the processor, further cause the processor to: monitor, using one or more gateways, passive signals from the one or more space sensors and boundary signals from the one or more boundary sensors.

21. The system of claim 16, wherein the space sensor is configured to provide at least 90% coverage of the space.

22. The system of claim 16, wherein the space sensor includes a motion sensor that senses motion within the space.

23. The system of claim 16, wherein the boundary includes a door, a passageway, an ingress, an egress, an arbitrarily defined boundary area, or a combination thereof.

24. The system of claim 16, wherein the boundary sensor is configured to cover at least 90% of the boundary of the space.

25. The system of claim 16, wherein the boundary sensor includes an optical curtain sensor, a magnetic curtain sensor, a break-beam sensor, an infrared curtain sensor, a video sensor, or a combination thereof.

26. The system of claim 16, wherein the boundary sensor is configured to sense directionality of movement into or out of the space.

27. The system of claim 16, wherein the space sensor and/or the boundary sensor are configured to communicate via a low energy consumption communication protocol or via a wireless communication protocol.

28. The system of claim 16, wherein the instructions, when executed by the processor, further cause the processor to control one or more affordances based on the indication that the space is not occupied.

29. The system of claim 28, wherein the one or more affordances include lighting, environmental control, or a combination thereof.

30. A method of detecting occupancy of a space, the method comprising:
a) receiving a passive signal from one or more space sensors, the passive signal corresponding to sensing presence or movement in the space, the passive signal having a passive signal falling edge that occurs when the one or more space sensors cease sensing presence or movement in the space;
b) receiving a boundary signal from one or more boundary sensors, the boundary signal corresponding to detecting movement into or out of the space, the boundary signal having a boundary signal falling edge that occurs when the one or more boundary sensors ceases detecting movement into or out of the space, wherein the passive signal falling edge and the boundary signal falling edge occur within a predetermined time period of one another; and
c) providing an indication that the space is not occupied.

31. The method of claim 30, the method further comprising monitoring, using one or more gateways, passive signals from the one or more space sensors and boundary signals from the one or more boundary sensors.

32. The method of claim 30, wherein the space is a room or an arbitrarily-defined area or volume.

33. The method of claim 30, wherein the one or more space sensors include an infrared sensor, a floor pressure sensor, an ultrasonic sensor, a microwave sensor, a video sensor, an acoustic sensor, or a combination thereof.

34. The method of claim 30, wherein the one or more space sensors include a passive infrared sensor.

35. The method of claim 30, wherein the one or more space sensors are configured to provide at least 90% coverage of the space.

36. The method of claim 30, wherein the one or more space sensors include a motion sensor that senses motion within the space.

37. The method of claim 30, wherein the one or more boundary sensors are configured to sense movement through a boundary of the space.

38. The method of claim 34, wherein the boundary includes a door, a passageway, an ingress, an egress, an arbitrarily defined boundary area, or a combination thereof.

39. The method of claim 34, wherein the one or more boundary sensors are configured to cover at least 90% of the boundary of the space.

40. The method of claim 30, wherein the one or more boundary sensors include an optical curtain sensor, a magnetic curtain sensor, a break-beam sensor, an infrared curtain sensor, a video sensor, or a combination thereof.

41. The method of claim 30, wherein the one or more boundary sensors are configured to sense directionality of movement into or out of the space.

42. The method of claim 30, wherein the one or more space sensors and/or the one or more boundary sensors are configured to communicate via a low energy consumption communication protocol or via a wireless communication protocol.

43. A method of controlling one or more affordances within a space, the method comprising the method of claim 30, and further comprising controlling the one or more affordances based on the indication that the space is not occupied.

44. The method of claim 43, wherein the one or more affordances include lighting, environmental control, or a combination thereof.

* * * * *